UNITED STATES PATENT OFFICE.

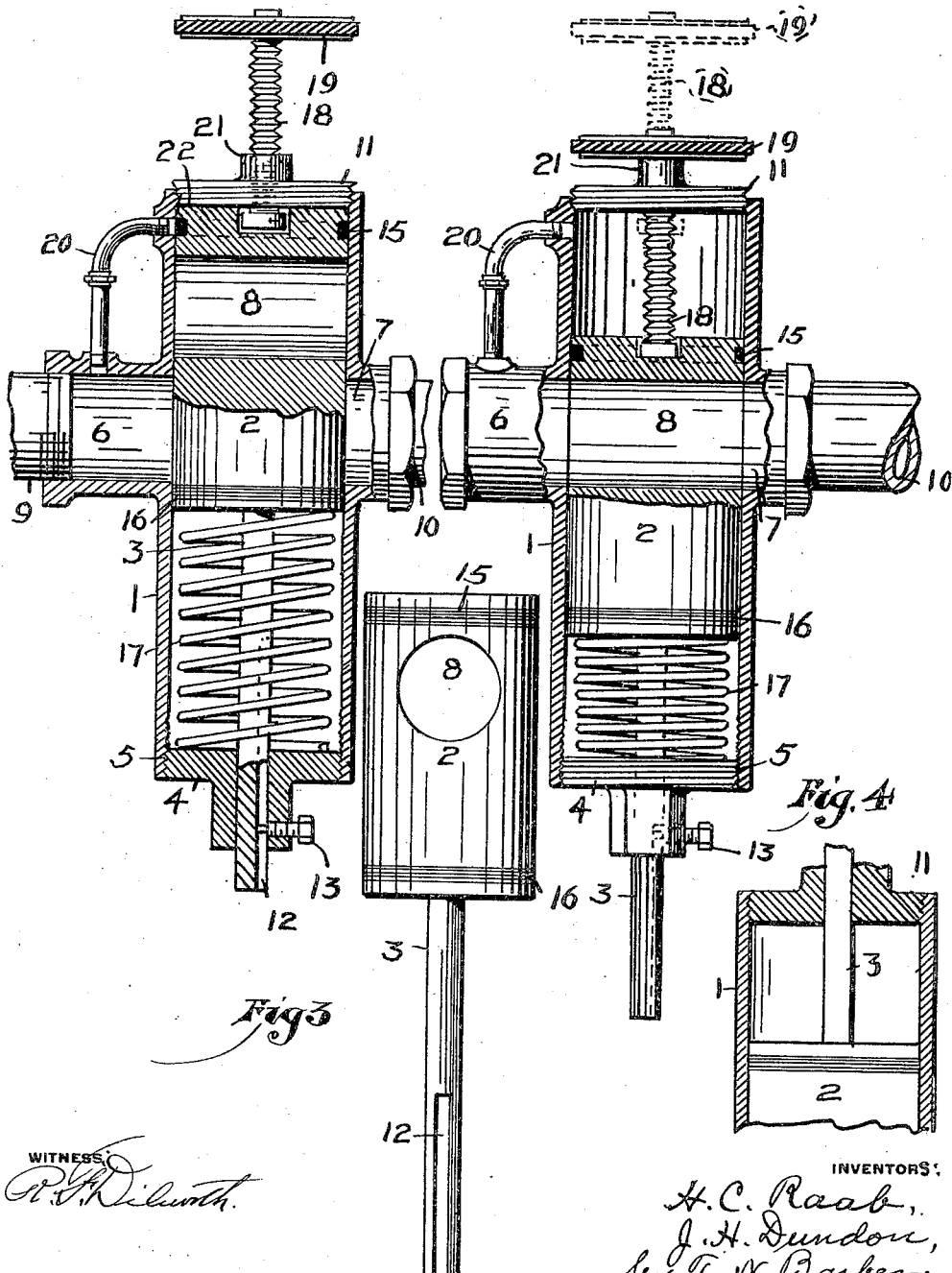

HENRY C. RAAB, OF GARRETTSVILLE, AND JOHN H. DUNDON, OF YOUNGSTOWN, OHIO.

VALVE.

1,312,644.        Specification of Letters Patent.        Patented Aug. 12, 1919.

Application filed February 26, 1919. Serial No. 279,408.

*To all whom it may concern:*

Be it known that we, HENRY C. RAAB and JOHN H. DUNDON, citizens of the United States, residing, respectively, at Garrettsville, in the county of Portage and State of Ohio, and at Youngstown, in the county of Mahoning and State of Ohio, have invented new and useful Improvements in Valves, of which the following is a specification.

Our invention relates to a valve, which, after having been opened, remains open until the pressure of the fluid passing through the same, falls to a predetermined value, whereupon the valve closes and remains closed until again opened by hand or equivalent external means.

Our object is to provide a valve which is reliable and relatively cheap. Another object is to provide an automatic safety valve for steam, water, gas, oil, compressed air and like lines, in which the pressure may fall and then return to its normal value. In gas lines the pressure sometimes drops so as to extinguish all the burners connected thereto. When the gas pressure returns, the gas flows through the unlit burners, causing dangerous explosions if the escaping gas reaches a flame. In many cases it would be undesirable and even dangerous to allow fluids to escape freely after a reduction of pressure in the feed lines. Our invention is designed to prevent the flow of the fluid after the line pressure has been reduced below a predetermined value.

Referring to the accompanying drawing, Figure 1 is a central vertical section showing our valve closed; Fig. 2, a similar section showing the valve open; Fig. 3, a side view of the cut-off or valve proper; and Fig. 4, a sectional view showing their device inverted and the closing spring omitted for use where the normal line pressure is very low.

On the drawing, 1 designates a cylindrical casing containing the cylindrical plunger-type valve 2 having the stem 3 extending through the end closure or screw-plug 4 which may be adjusted in the casing by the screw-threads 5 on the plug and casing wall. The casing is provided on one side with the inlet 6 and on the other side with the outlet 7, in line with each other. The valve 2 has the transverse opening 8 adapted to be placed in line with the inlet 6 and the outlet 7 so that fluid may flow from the inlet pipe 9 through the inlet 6, the valve-opening 8, and the outlet 7 into the outlet pipe 10.

The remaining end of the casing 1 is closed by the screw-plug 11. The helical spring 17, which surrounds the stem 3 and lies between the screw-plug 4 and the valve 2, exerts a pressure on the latter toward the screw-plug 11.

The stem has the longitudinal groove 12 into which the screw 13 may extend to hold the valve with the opening 12 in line with the inlet 6 and the outlet 7. The groove 12 provides a drain for any fluid which may escape into the chamber containing the spring 17. The end of the screw 13 is made small enough to allow fluid to flow past it in the groove 12. By turning the plug 4 the tension of the spring 17 may be adjusted for different fluids passing through the valve.

The valve 2 has packing rings 15 and 16 around its ends to prevent fluid from escaping between the casing and the valve.

The valve 2 is forced along the casing in opposition to the spring 17 by means of the screw 18 which works in the screw-plug 11 and is operated by the hand-wheel 19. A by-pass 20 is provided between the inlet 6 and the interior of the casing opposite the solid end 22 of the valve 2 when in its closed position (Fig. 1).

Suppose a fluid, such as compressed air, is to be conducted through the valve, the parts being as in Fig. 1, which shows it closed. The hand-wheel 19 is rotated so as to cause the screw 18 to drive the valve 2 against the pressure of the spring 17 until the valve-opening 8 registers with the inlet 6 and outlet 7, which may be determined by having the hand-wheel 19 engage the projection 21 on the plug 11 at that time. As soon as the valve 2 has been opened, the pressure of the air flowing through the by-pass 20 against the end of the valve opposite the spring 17 holds the valve open, and the screw is then run back to its original position shown in dotted lines on Fig. 2. If the pressure of the compressed air becomes reduced below a predetermined value, dependent on the pressure exerted on the spring 17 by the screw-plug 4, the spring 17 will overcome the pressure of the air on the end of the valve and the latter will close. The air can not pass the valve again until the screw 18 has again opened.

In case our invention is used on a gas service line where the pressure is but a few ounces above normal atmospheric pressure, the entire device will be inverted from the position shown on Figs. 1 and 2 and the spring omitted, as shown on Fig. 4. In this case the valve 2 when opened will be held open by the gas from the by-pass, and will be closed by gravity or the weight of the valve, when the gas pressure is sufficiently reduced.

We claim:—

1. In a safety valve, a casing, a plunger-valve reciprocable therein, a stationary by-pass arranged to admit fluid pressure to the valve from the inlet side thereof through the casing above the valve to hold it open, hand-operated means for opening the valve mechanically connected thereto, and means for closing the valve when the fluid pressure is reduced below a predetermined value, the valve being positioned when closed so as to prevent the gas from opening it.

2. In a safety valve, a casing, a plunger-valve reciprocable therein, a by-pass arranged to admit fluid pressure to the valve from the inlet side thereof to hold it open, hand-operated means for opening the valve mechanically connected thereto, and a spring for closing the valve when the fluid pressure is reduced below a predetermined value, the valve being positioned when closed so as to prevent the gas from opening it.

3. In a safety valve, a casing, a plunger-valve reciprocable therein, a by-pass arranged to admit fluid pressure to the valve from the inlet side thereof to hold it open, hand-operated means for opening the valve mechanically connected thereto, a spring for closing the valve when the fluid pressure is reduced below a predetermined value, and means for adjusting the pressure of the spring, the valve being positioned when closed so as to prevent the gas from opening it.

4. In a safety valve, a casing, a plunger-valve reciprocable therein, a by-pass arranged to admit fluid pressure to the valve from the inlet side thereof through the casing above the valve to hold it open, hand-operated means for opening the valve, and means for closing the valve when the fluid pressure is reduced below a predetermined value, the valve presenting an obstruction to the by-pass when the valve is in closed position.

5. In a safety valve, a casing, a plunger-type valve reciprocable therein and having a transverse opening therethrough, inlet and outlet passages in the casing adapted to register with the valve opening when the latter is in open position to form an uninterrupted passage through the casing and valve, and obstructed by the valve when in closed position, means tending to move the valve to its closed position when in open position, manually-operated means for moving the valve to its open position, and a by-pass through the casing connecting the inlet passage to that end of the valve which is opposite the said closing means.

6. In a safety valve, a casing, a plunger-type valve reciprocable therein and having a transverse opening therethrough, inlet and outlet passages in the casing adapted to register with the valve opening when the latter is in open position to form an uninterrupted passage through the casing and valve, and obstructed by the valve when in closed position, means tending to move the valve to its closed position when in open position, manually-operated means for moving the valve to its open position, and a by-pass through the casing connecting the inlet passage to that end of the valve which is opposite the said closing means, the valve obstructing the by-pass when in its closed position.

7. In a safety valve, a casing, a plunger-type valve reciprocable therein and having a transverse opening therethrough, inlet and outlet passages in the casing adapted to register with the valve opening when the latter is in open position to form an uninterrupted passage through the casing and valve, and obstructed by the valve when in closed position, the valve being biased to its closed position when in open position, manually-operated means for moving the valve to its open position, and a by-pass through the casing connecting the inlet passage to that end of the valve which is opposite the said closing means.

Signed by the said HENRY C. RAAB at Youngstown, Ohio, this 6th day of Feb. A. D. 1919, and by the said JOHN H. DUNDON, at Youngstown, Ohio, this 6th day of Feb. A. D. 1919.

HENRY C. RAAB.
JOHN H. DUNDON.